(12) United States Patent
Voss

(10) Patent No.: US 10,040,129 B2
(45) Date of Patent: Aug. 7, 2018

(54) TOOL HEAD HAVING A SHRINK-FIT CHUCK

(71) Applicant: BILZ WERKZEUGFABRIK GMBH & CO. KG, Ostfildern (DE)

(72) Inventor: Michael Voss, Leonberg (DE)

(73) Assignee: BILZ WERKZEUGFABRIK GMBH & CO. KG, Ostfildern (DE)

( * ) Notice: Subject to any disclaimer, the term of this patent is extended or adjusted under 35 U.S.C. 154(b) by 182 days.

(21) Appl. No.: 14/767,202

(22) PCT Filed: Feb. 26, 2014

(86) PCT No.: PCT/EP2014/053728
§ 371 (c)(1),
(2) Date: Aug. 11, 2015

(87) PCT Pub. No.: WO2014/131797
PCT Pub. Date: Sep. 4, 2014

(65) Prior Publication Data
US 2015/0367423 A1     Dec. 24, 2015

(30) Foreign Application Priority Data

Mar. 1, 2013 (DE) .................. 10 2013 203 558

(51) Int. Cl.
*B23B 31/117* (2006.01)
(52) U.S. Cl.
CPC ....... *B23B 31/1179* (2013.01); *B23B 2231/24* (2013.01); *B23B 2240/28* (2013.01);
(Continued)
(58) Field of Classification Search
CPC ............. B23B 31/1179; B23B 2231/24; B23B 2250/12; B23B 2240/28; Y10T 279/17957; Y10T 279/17111
See application file for complete search history.

(56) References Cited

U.S. PATENT DOCUMENTS 5,311,654 A * 5/1994 Cook .................. B23B 31/00
279/103
5,975,817 A * 11/1999 Komine ............. B23B 31/001
279/20

(Continued)

FOREIGN PATENT DOCUMENTS

DE        102 44 759 A1    4/2004
DE    20 2007 003 045 U1   7/2008

(Continued)

OTHER PUBLICATIONS

International Search Report for PCT/EP2014/053728 (3 pgs.).

(Continued)

*Primary Examiner* — Daniel Howell
*Assistant Examiner* — Paul M Janeski
(74) *Attorney, Agent, or Firm* — Flynn, Thiel, Boutell & Tanis, P.C.

(57) ABSTRACT

A tool head having a shrink-fit chuck (10) that has an axial receiving hole (22), and having a tool (12) that is insertable by way of its cylindrical tool shank (24) into the receiving hole (22), which is open at the front end of the shrink-fit chuck (10), and is fixable therein by thermal shrinking of the shrink-fit chuck (10). The shrink-fit chuck (10) has, in its front end portion, an annular recess (30) that radially widens the receiving hole (22) and is open at the end side, and a function ring (14) is positioned on the tool shank (24), wherein, in the shrink-fitted state, the tool shank (24) is frictionally fixed in the receiving hole (22) and the function ring (14) sits at least partially in the annular recess (30).

13 Claims, 1 Drawing Sheet

(52) U.S. Cl.
CPC .... *B23B 2250/12* (2013.01); *Y10T 279/17111* (2015.01); *Y10T 279/17957* (2015.01)

(56) References Cited

U.S. PATENT DOCUMENTS

| | | | | |
|---|---|---|---|---|
| 6,887,019 | B1* | 5/2005 | Gerber | B23B 31/028 |
| | | | | 279/102 |
| 8,439,369 | B2* | 5/2013 | Haimer | B23B 31/00 |
| | | | | 279/102 |
| 2011/0156363 | A1* | 6/2011 | Haimer | B23B 31/02 |
| | | | | 279/20 |
| 2015/0042050 | A1* | 2/2015 | Haimer | B23B 31/1179 |
| | | | | 279/102 |

FOREIGN PATENT DOCUMENTS

| | | | | |
|---|---|---|---|---|
| DE | 10 2012 101 672 | * | 8/2013 | ......... B23B 31/1179 |
| EP | 1 155 765 A1 | | 11/2001 | |
| WO | WO 2010/023412 A1 | | 3/2010 | |
| WO | WO 2011/138360 A1 | | 11/2011 | |
| WO | WO 2013/127606 A1 | | 9/2013 | |

OTHER PUBLICATIONS

English translation of the International Preliminary Report on Patentability and Written Opinion of the International Searching Authority (8 pages).

* cited by examiner

TOOL HEAD HAVING A SHRINK-FIT CHUCK

FIELD OF THE INVENTION

The invention relates to a tool head, comprising a shrink-fit chuck, which is capable of being rotatingly driven and has an axial receiving bore, and a tool, which is insertable with its cylindrical tool shank into the receiving bore that is open on the front end face of the shrink-fit chuck and is fixable therein by thermal shrinkage of the shrink-fit chuck, in particular a rotary tool such as a drill or milling cutter.

BACKGROUND OF THE INVENTION

From WO 2011/138360, a tool holder having a shrink-fit chuck and having a nozzle device for applying a liquid and/or gaseous medium to a rotary tool is known. There the nozzle device consists of a sleeve, which is screwed onto the outside of the chuck body and at its front end is provided with a nozzle ring. Prior to the shrinking operation, the nozzle device must be removed, which requires additional handling effort.

OBJECT OF THE INVENTION

On this basis, the object of the invention is to further improve the devices known in the prior art and to enable, with simple measures and reduced handling effort, increased functionality with respect to a positioning and cooling of the tool, without the need to accept complex changes of machinery or restrictions of the work space.

For the achievement of this object, the combination of features which is defined in the claims is proposed. Advantageous embodiments and refinements of the invention emerge from the dependent claims.

SUMMARY OF THE INVENTION

The invention is based on the notion of reversibly connecting a clampable functional or intermediate element to the tool shank of a machining tool. Accordingly, it is proposed according to the invention that the shrink-fit chuck has on its front end face portion an annular recess, which radially widens the receiving bore and is open at the front end, and that a functional ring is positioned on the tool shank, wherein, in the shrunken state, the tool shank is frictionally fixed in the receiving bore and the functional ring sits at least partially in the annular recess. It is thereby possible, together with the tool, to clamp a functional element which is received without interference contour in the chuck, wherein the chuck-related adaptations are unproblematic in terms of design and, in particular, do not impair inductive shrinking. In this context, by the term "ring" is understood in general terms a body (functional ring) which is circumferentially closed or largely closed or assembled in the shape of a circle, a polygon, or in some other geometric shape or a correspondingly bounded space (annular recess).

Advantageously, the functional ring, on its inner face, is in frictional engagement with the shell surface of the tool shank, so that a self-locking is achieved and a prepositioning is possible without problems. A further improvement in this respect is achieved by virtue of the fact that the functional ring, in the unshrunken initial state, is positioned removably on the tool shank, wherein the axial position can be chosen so as to set the length of the freely projecting front portion of the tool.

A further advantageous embodiment provides that the functional ring, in the initial state, has a radial oversize in relation to the annular recess. In this way, a shrink fastening of the functional ring in the course of the shrinking of the tool is also possible.

In order to ensure a predefined orientation, it is also of advantage if the functional ring is fixed by a positive connection in a torsionally secure manner in a defined angular position in the annular recess.

In a particularly preferred embodiment, the functional ring is configured as a nozzle ring having at least one nozzle for applying cooling lubricant to the tool. Hence, in the course of the rotation operation, fluid can purposefully be supplied to the tool without the additional need for a large available space.

In order to create a co-rotating atomizing cone, it is of advantage if the functional ring has a plurality of nozzles, which are distributed in the peripheral direction and are continuous in the axial ring direction, for the conveyance of cooling lubricant. A particular design improvement can be achieved by virtue of the fact that the functional ring has axially continuous nozzle slots which are laterally open on its inner casing, wherein the nozzle slots extend outward in the radial direction, or at an angle diagonally thereto.

For the simple annular distribution of a medium onto the nozzles, it is advantageous if the annular recess has a free annular space, bounded in the forward direction by the functional ring, for the introduction and distribution of cooling lubricant. This can be realized in a structurally particularly advantageous manner by the annular recess being configured as a stepped bore which widens toward the front, wherein the front bore portion receives the functional ring fully, or at least predominantly, in its axial extent.

For connection to a machine-side cooling lubricant supply, it is advantageous if the shrink-fit chuck has a supply channel for cooling lubricant, which supply channel leads from a rear clamping portion, which is clampable into a machine spindle, to the annular recess. In this context, it is also favorable if the shrink-fit chuck, in a sleeve portion enclosing the tool shank, has at least one longitudinal bore for the conveyance of cooling lubricant.

The subject of the invention is also a shrink-fit chuck for a tool head, comprising an axial receiving bore, for the shrink-fastening of the tool shank of a tool, and an annular recess, which radially widens the receiving bore on the front end face portion and is open at the front end, for receiving a functional ring that is positionable on the tool shank.

BRIEF DESCRIPTION OF THE DRAWINGS

The invention is explained in greater detail below on the basis of an illustrative embodiment represented schematically in the drawing, wherein.

DETAILED DESCRIPTION OF THE INVENTION

Figure 1:
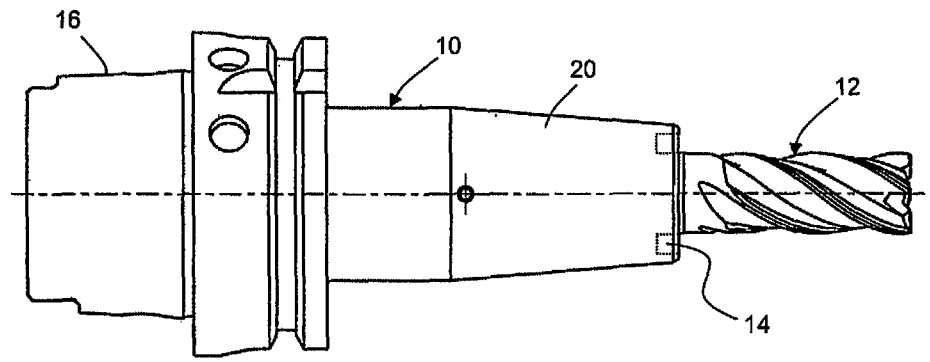
FIG. 1 shows a tool head having a shrink-fit chuck and a therein inserted drilling tool in side view.

The tool head shown in the drawing substantially consists of a shrink-fit chuck 10, a therein inserted rotary tool in the form of a drill 12, and a functional ring 14 positioned on the drill and accommodated in an end face recess of the shrink-fit chuck.

Figure 2:
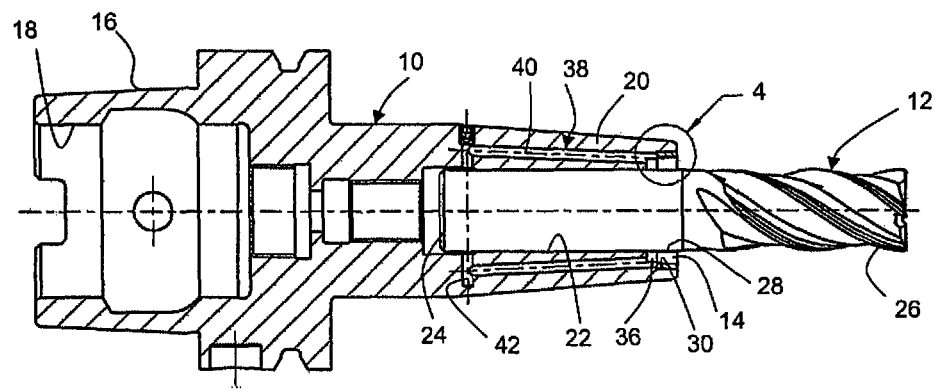
FIG. 2 shows an axial section of the tool head according to FIG. 1.

As can best be seen from FIGS. 1 and 2, the shrink-fit chuck 10 possesses a hollow shank taper 16 for docking to a machine spindle. The cavity 18 of said hollow shank taper serves for the supply of cooling lubricant to the machine, which cooling lubricant can be injected via a channel system through the functional ring 14 onto the rotary tool 12, for cooling, lubrication and clearance of the work zone, as is explained in greater detail below.

The chuck body 20 comprises as the sleeve section a receiving bore 22, which is open on the front end face of the shrink-fit chuck 10 and possesses a somewhat smaller nominal diameter than the tool shank 24, so that the latter can be clamped in place, in a manner which is known per se, by inductive heating of the chuck body 20 (FIG. 2). In the shrunken state, the tool shank 24 for transmitting a torque to the front cutting portion 26 of the drill 12 is frictionally held in a rotationally secure manner in the press fit. For the unshrinking, the chuck body 20 is likewise merely heated on one side, until the thermal expansion releases the drill again for removal purposes.

In the unshrunken state of the drill 12, the circular-cylindrical functional ring 14 can be placed onto the tool shank 24 and positioned, by displacement, so that the length of the freely projecting front portion of the drill 12 is settable. The functional ring 14 should here be mounted, and, where necessary, also pulled off, via the rear end of the tool shank 24, so as not to damage the cutting portion 26. At the same time, the functional ring 14, which on its inner side 28 is in frictional engagement with the shell surface of the tool shank 24, should be dimensioned in terms of the inside diameter such that an unwanted adjustment is avoided through adequate static friction.

In order to accommodate the functional ring 14 in flush-mounted arrangement, the shrink-fit chuck 10 possesses an annular recess 30, which is open at the front end and radially widens the front end portion of the receiving bore 22. In the initial state, the functional ring 14 has a radial oversize in relation to the annular recess 30, thus, besides the tool shank 24, a shrink fastening of the functional ring 14 in the chuck body 20 is also possible. In addition, it is conceivable to fix the functional ring 14 by a positive connection (not shown) in a rotationally secure manner in a defined angular position in the annular recess 30. This can be realized, for example, by an axially or radially engaging cam or a locating pin. A complementary locating contour of the annular recess 30 and of the functional ring 14, which locating contour differs from the circular form, would also be conceivable.

Figure 3:
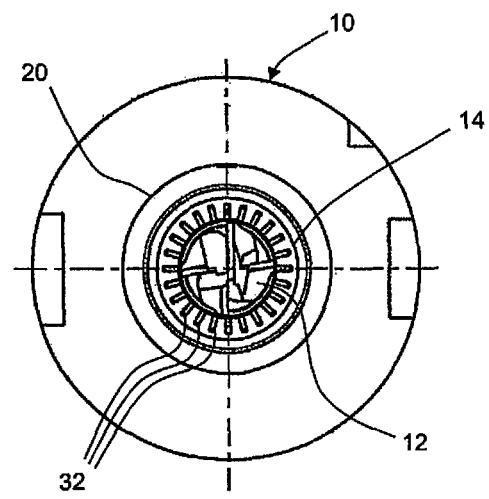
FIG. 3 shows an end face view of the tool head according to FIG. 1.
Figure 4:
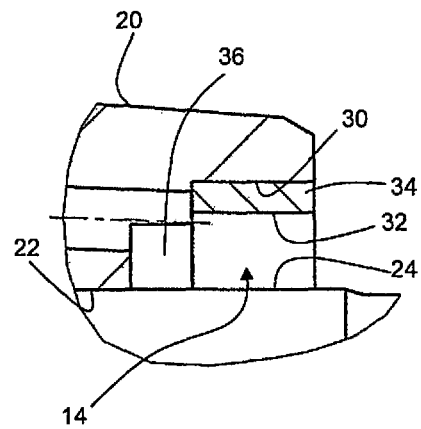
FIG. 4 shows a detail enlargement of FIG. 2 in the region of a nozzle ring.

As is also evident from FIGS. 3 and 4, the functional ring 14 has a plurality of nozzles 32, distributed in its peripheral direction, for the conveyance of a medium or fluid (cooling lubricant). The nozzles 32 are open, as nozzle slots, on the inner side of the functional ring 14 and pass axially through its wall. The nozzle slots 32 here extend in the radial direction, so that a residual wall 34 of the functional ring 14 to the outside is retained. An optional different orientation of all or individual nozzles 32 is also conceivable, though an orifice-side orientation toward the cutting portion 26 of the drill 12 should be given in any event. The clear cross sections of the nozzles 32 can be tailored to the medium to be conveyed, in order to achieve an ejection with high flow velocity; for instance, just air, a liquid-air mixture, or just a liquid, can be conveyed.

On its axially inner inlet side, the nozzles 32 communicate with an annular space 36, which in the chuck body 20, as the stepped bore portion of smaller outside diameter, adjoins the annular recess 30 for the nozzle ring 14. The connection to a machine-side supply of medium is realized via the cavity 18 of the hollow shank taper 16 and a supply channel 38 in the chuck body 20. The supply channel 38 comprises two longitudinal bores 40, which are situated diametrically opposite each other and communicate, via a radial blind hole 42 which is blocked off on one side, with an annular gap on the shank end of the drill 12. The flow cross sections are here tailored such that a high pressure of the medium can be maintained right up to the annular space 36.

As described above, the functional ring 14 thus has a multipurpose use as a nozzle ring for the purposeful injection of cooling lubricant onto the tool 12 and as positioning for the presetting of the freely projecting working length of the tool 12, wherein each function is selectively available. Insofar as the functional ring 14 is not required, it can also be removed from the drill 12, wherein the annular recess 30 which then remains free permits a coolant discharge in a manner which is known per se.

The invention claimed is:

1. A tool head, comprising a shrink-fit chuck (10), which has an axial receiving bore (22), and a tool (12), which is insertable with its cylindrical tool shank (24) into the receiving bore (22) that is open on the front end face of the shrink-fit chuck (10) and is fixable therein by thermal shrinkage of the shrink-fit chuck (10), characterized in that the shrink-fit chuck (10) has on its front end face portion an annular recess (30), which radially widens the receiving bore (22) and is open at the front end, and in that a functional ring (14) is positioned on and in frictional engagement with the tool shank (24), wherein, in the shrunken state, the tool shank (24) is frictionally fixed in the receiving bore (22) and the functional ring (14) sits at least partially in the annular recess (30).

2. The tool head as claimed in claim 1, characterized in that the functional ring (14), on its inner surface, is in frictional engagement with the shell surface of the tool shank (24).

3. The tool head as claimed in claim 1, characterized in that the functional ring (14), in the unshrunken initial state, is positioned removably on the tool shank (24), wherein the axial position can be chosen so as to set the length of the freely projecting front portion of the tool (12).

4. The tool head as claimed in claim 1, characterized in that functional ring (14), in the initial state, has a radial oversize in relation to the annular recess (30).

5. The tool head as claimed in claim 1, characterized in that the functional ring (14) is fixed by a positive connection in a rotationally secure manner in a defined angular position in the annular recess (30).

6. The tool head as claimed in claim 1, characterized in that the functional ring (14) is configured as a nozzle ring having at least one nozzle (32) for applying cooling lubricant to the tool (12).

7. The tool head as claimed in claim 1, characterized in that the functional ring (14) has a plurality of nozzles (32), which are distributed in the peripheral direction and are continuous in the axial ring direction, for the conveyance of cooling lubricant.

8. The tool head as claimed in claim 1, characterized in that the functional ring (14) has as the nozzles (32) axially continuous nozzle slots, which are laterally open on its inner jacket, wherein the nozzle slots extend outward in the radial direction, or at an angle inclined thereto.

9. The tool head as claimed in claim 1, characterized in that the annular recess (30) has a free annular space, bounded in the forward direction by the functional ring (14), for the introduction and distribution of cooling lubricant.

10. The tool head as claimed in claim 1, characterized in that the annular recess (30) is configured as a stepped bore which widens toward the front, wherein the front bore portion receives the functional ring (14) fully in its axial extent.

11. The tool head as claimed in claim 1, characterized in that the shrink-fit chuck (10) has a supply channel (38) for cooling lubricant, which supply channel leads from a rear clamping portion, which is clampable into a machine spindle, to the annular recess (30).

12. The tool head as claimed in claim 1, characterized in that shrink-fit chuck (10), in a sleeve portion enclosing the tool shank (24), has at least one longitudinal bore (40) for the conveyance of cooling lubricant.

13. A shrink-fit chuck for a tool head as claimed in claim 1, comprising an axial receiving bore (22), for the shrink fastening of the tool shank (24) of a tool (12), and an annular recess (30), which radially widens the receiving bore (22) on the front end face portion and is open at the front end, for the reception of a functional ring (14) positionable on the tool shank (24).

* * * * *